Nov. 3, 1964 T. V. SELING 3,155,974
SPEED MEASURING SYSTEM
Filed Oct. 2, 1958
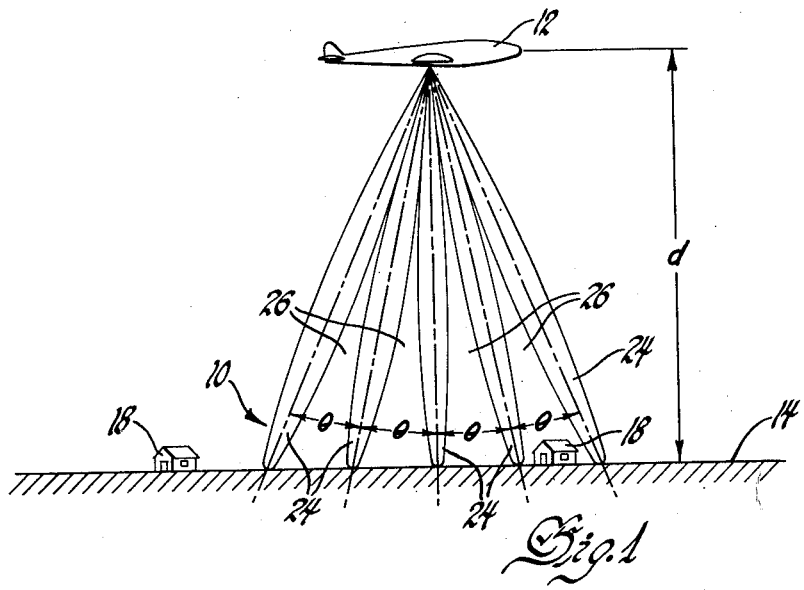
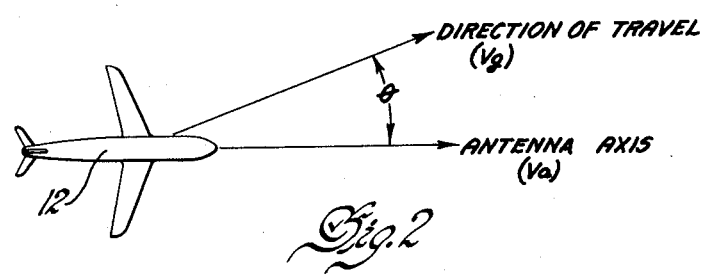
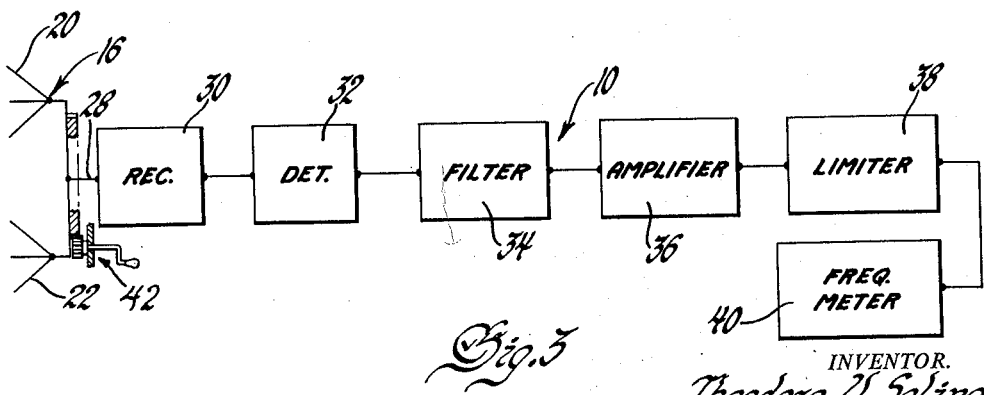
INVENTOR.
Theodore V. Seling
BY
ATTORNEY

United States Patent Office 3,155,974
Patented Nov. 3, 1964

3,155,974
SPEED MEASURING SYSTEM
Theodore V. Seling, Davison, Mich., assignor to General Motors Corporation, Detroit, Mich., a corporation of Delaware
Filed Oct. 2, 1958, Ser. No. 765,711
2 Claims. (Cl. 343—100)

The present invention relates to means for determining the rate of relative movement between a pair of moving bodies by receiving means located on one of the bodies for sensing changes in the electromagnetic radiations from the other body.

The most widely used method of determining the rate of relative movement between two bodies is to maintain visual contact therebetween and observe the relative movement. If this is impossible, contact may be maintained by means of a so-called radar system in which an electromagnetic signal is radiated from the first body so as to strike the second body and be reflected and returned to the first body. The period of time required for a reflected signal to be returned to the first body indicates the distance between the two bodies and the rate at which the periods of time change will provide an indication of the relative speed between the two bodies.

Although system of this nature are generally satisfactory, the transmitting equipment, etc. is not only expensive but also consumes considerable amounts of power and has a considerable amount of weight. These factors are particularly undesirable in aircraft. In addition, when the radar transmitter is in use during a military operation, the enemy can detect the location of the transmitter and, in addition, can take various steps to "jam" the system so that it does not operate properly.

It is now proposed to provide a system for measuring the relative speed between two bodies which is free from the foregoing objections. More particularly, this is to be accomplished by providing one of the bodies, for example an aircraft, with a receiving means having an antenna network adapted to scan a target area and to detect the electromagnetic radiations inherently radiated from any targets therein. The expressions "target area" and "target" are not intended to imply a military objective, but instead, are intended to mean, respectively, the area being scanned by the antenna, for example, the surface of the earth, and any objects thereof of contrasting radiations, for example, bodies of water, buildings, etc. The antenna network comprises a pair of antennas that are arranged so that the fields thereof will overlap each other. As a result, the antenna network will have an interference pattern consisting of angularly disposed zones of maximum sensitivity separated by zones of minimum sensitivity. Thus, as the target area, such as the surface of the earth, passes through the field of the antenna network, the radiations from any targets thereon will be alternately emitted in the zones of maximum sensitivity and zones of minimum sensitivity. This will cause cylic variations in the strength of the signals sensed by the antenna system. The frequency of these variations will be determined by the rate at which the target passes through the zones of contrasting sensitivity which, in turn, will be a function of the relative velocity between the bodies and the spacing of the zones. Since the spacing between the zones between the zones is readily determined, the frequency of the variations in the received energy will be indicative of the relative speed between the aircraft and the target area.

In the drawing:

FIGURE 1 is a diagrammatic view of an aircraft equipped with the present invention, flying over the surface of the earth.

FIGURE 2 is a plan view of the aircraft employed in FIGURE 1.

FIGURE 3 is a block diagram of the speed measuring system employed in the aircraft of FIGURE 1.

Referring to the drawings in more detail, the present invention is embodied in a speed measuring system 10, particularly adapted for determining the ground speed of an aircraft 12 as it travels above the surface of the earth 14. This speed measuring system employs an antenna network 16 located on the bottom of the aircraft 12 and tuned to sense the thermal or electromagnetic radiations that are inherently radiated from the surface of the earth 14 and the objects 18 thereon. Although the major portion of this radiated energy falls in the infrared band of the spectrum, it has been found that under some circumstances, materials in the atmosphere such as clouds, rain, etc. absorb the major portion of the radiations and prevent reliable transmission of the energy in this band to the higher altitudes. Accordingly, the antenna network 16 is preferably tuned to the so-called microwave portion of the spectrum wherein the wave lengths are sufficiently long to reliably penetrate through the atmosphere to all altiudes.

The present antenna network 16 includes a pair of similar antennas 20 and 22 that are arranged so that their fields overlap each other. As a result, the sensitivity pattern of the antenna network 16 will be similar to that illustrated in FIGURE 1 wherein a plurality of zones 24 of maximum sensitivity are disposed at angle $\theta$ relative of each other. These zones 24 of maximum sensitivity are separated from each other by zones 26 of minimum sensitivity. It may thus be seen that, if a signal is originating in one of the zones 24 of maximum sensitivity, there will be a strong signal in the output 28 of the antenna network 16. Conversely, if the signal originates in a zone 26 of minimum sensitivity, the output 28 of the antenna network 16 will have little or no signal therein.

Thus as the aircraft 12 travels over the surface of the earth 14, the antenna network 16 will scan the target area and receive any radiations from any targets 18 in the area. As the targets 18 in the target area pass from one zone 24 or 26 to the next, there will be cyclic variations in the intensity of the signal output of the antenna network 16 and the frequency thereof will correspond to the rate at which the target 18 passes through the zones 24 and 26. This rate will be determined by the length of the target path between corresponding zones and the relative velocity between the aircraft 12 and the ground targets 18. Since the angle $\theta$ between the zones 24 is known and the altitude of the aircraft will be known, the length of the target path can be easily determined.

The output of the antenna network 16 is connected to the input of a receiver 30 which is tuned to the same microwave frequencies as the antenna network 16 and is effective to amplify the signals sensed thereby. The output from this receiver 30 will vary in intensity as the target 18 or the origin of the signals passes from one zone to the next zone. A detector 32 connected to the output of the receiver 30 will detect or demodulate the receiver output to produce a signal corresponding to the variations in the signal sensed by the network 16. The detector 32, in turn, feeds the signal into a filter 34 that will improve the signal-to-noise ratio by passing only those frequencies corresponding to the frequencies of the variations. The filtered output is then fed into an amplifier 36 where it is amplified to a more useful level. The amplified signal is then fed into a limiter 38 and then into a frequency meter 40 which is effective to indicate the frequency of the variations, i.e., the rate at which the target area passes under the antenna network 16.

It may thus be seen that as the antenna system 16 scans a target area and a target 18 passes through the zones 24 and 26 of contrasting sensitivity, there will be fluctuations in the intensity of the signal supplied to the receiver 30. These fluctuations will have a frequency equal to the frequency at which the target 18 passes through the zones 24 and 26. Since the angle $\theta$ between the zones is known, the length of the target path between zones of corresponding sensitivity may be easily determined by determining the distance from the antenna network 16 to the path of the target. Thus, the relative speed of the aircraft 12 and ground 14 can be determined.

In the event the lateral drift of the aircraft 12 is an important factor, the antenna network 16 may be rotatably mounted on the aircraft 12 as diagrammatically indicated at 42 so that the axis of the network 16 or the sensitivity pattern thereof may be rotated relative to the aircraft 12. It is to be understood that this rotatable mounting may be accomplished by any suitable mechanical means. Thus, the sensitivity pattern may be oriented with respect to the movement of the target 18 across the target area and change the angle $\phi$ between the antenna axis and the direction of travel. When the line of travel of the target 18 is normal to the zones 24 of maximum sensitivity, i.e., angle $\phi$ is zero, the frequency of the variations will be a maximum amount. Under these circumstances the angle $\phi$ will be equal to the angle of drift. In addition, when the axis of the antenna network 16 is at right angles to the line of travel, i.e., angle $\phi$ is $\pm 90°$, the frequency of the variations will be substantially zero.

Thus it may be seen the present speed measuring system is of a passive nature and does not require the aircraft to transmit any signals. However, it is capable of determining the true ground speed of an aircraft at all times independent of any visual contact with the surface of the earth. It should be noted that, although the present system has been described with particular reference to use in an aircraft, it is equally suitable for use on the ground for observing an aircraft, etc.

It is to be understood that, although the invention has been described with specific reference to a particular embodiment thereof, it is not to be so limited since changes and alterations therein may be made which are within the full intended scope of this invention as defined by the appended claims.

What is claimed is:

1. A system for measuring the relative velocity between a body and a target comprising a multi-lobe antenna system mounted on the body for receiving electromagnetic radiations from a target area, the antenna system having an axis in a predetermined alignment with said body and producing an interferometer pattern comprising zones disposed along said axis of maximum sensitivity separated by zones of minimum sensitivity, said zones having a predetermined angular spacing, receiver means coupled to said antenna system for developing a signal voltage corresponding to the received electromagnetic radiations, a detector coupled to the receiver means for developing a signal voltage corresponding to the cyclic variations of the received radiations, and frequency responsive means connected with the detector for measuring the frequency of the cyclic variations as an indication of the component of relative velocity between the body and the target along the axis of said antenna system.

2. The system defined in claim 1 wherein said body is an aircraft and the antenna system is rotatably mounted thereon so that the direction of the interferometer pattern wih reference to he aircraft may be adjusted to obtain a maximum frequency of said cyclical variations as indicated by the frequency responsive means.

References Cited in the file of this patent

UNITED STATES PATENTS

| | | |
|---|---|---|
| 2,223,224 | Newhouse | Nov. 26, 1940 |
| 2,403,625 | Wolff | July 9, 1946 |
| 2,412,165 | McDermott | Dec. 3, 1946 |
| 2,422,064 | Anderson et al. | June 10, 1947 |
| 2,458,654 | Southworth | Jan. 11, 1949 |
| 2,527,548 | Hastings | Oct. 31, 1950 |
| 2,865,019 | Harrison | Dec. 16, 1958 |
| 2,866,373 | Doyle et al. | Dec. 30, 1958 |
| 3,004,219 | Albert | Oct. 10, 1961 |
| 3,016,531 | Tomiyasu et al. | Jan. 9, 1962 |